UNITED STATES PATENT OFFICE.

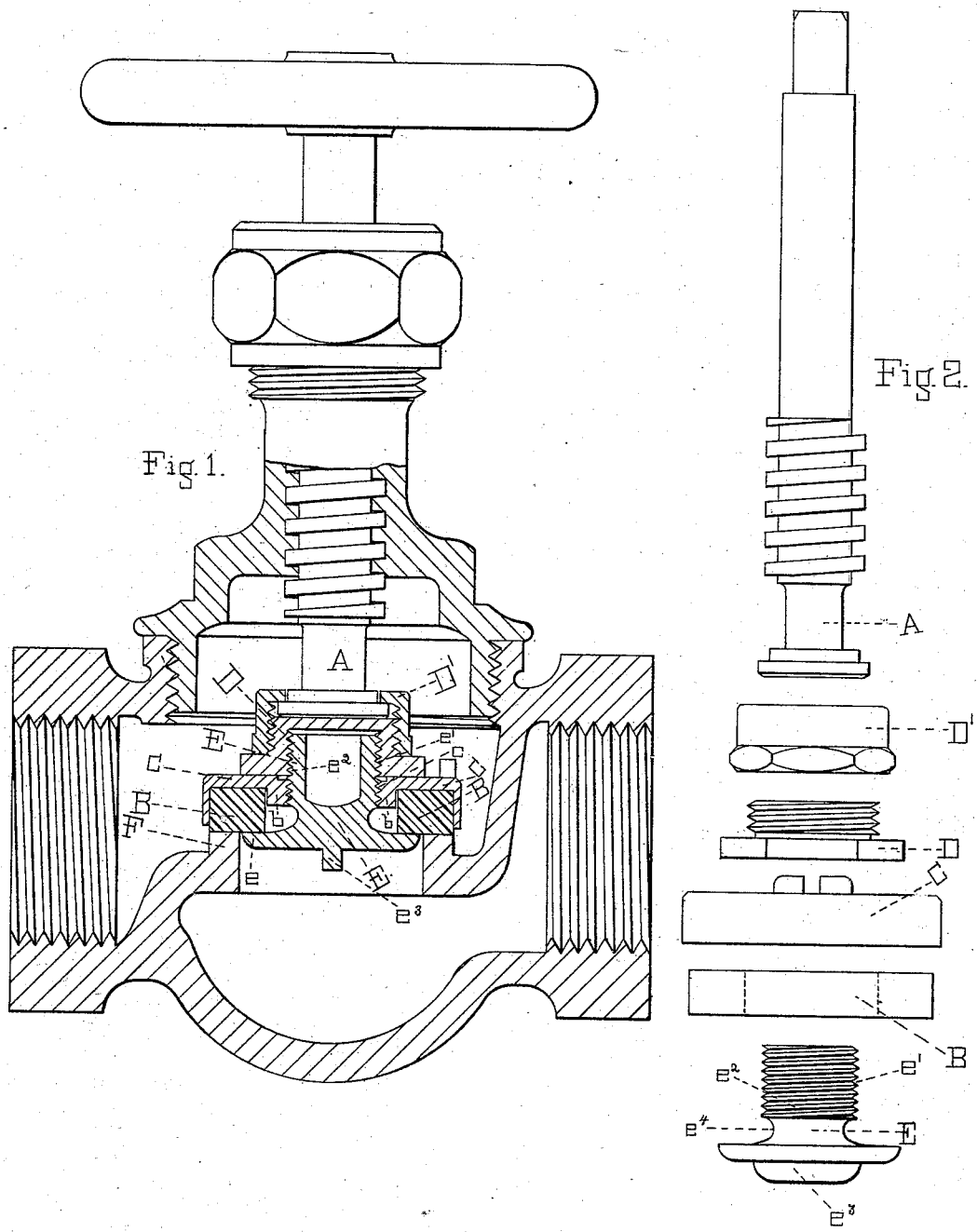

EDWIN R. TOMLINSON, OF WEST STRATFORD, CONNECTICUT.

VALVE.

SPECIFICATION forming part of Letters Patent No. 262,997, dated August 22, 1882.

Application filed April 17, 1882. (No model.)

*To all whom it may concern:*

Be it known that I, EDWIN R. TOMLINSON, of West Stratford, in the county of Fairfield and State of Connecticut, a citizen of the United States, have invented a new and useful Improvement in Valves, of which the following is a full, clear, and exact description, reference being had to the accompanying drawings, forming a part of this specification, in explaining its nature, in which—

Figure 1 is a view of a globe-valve, part in elevation and part in section, containing my invention; and Fig. 2 is a view in elevation illustrating the construction.

This invention relates especially to means of holding the disk of packing comprising one of the seats of a valve in the disk-holder; and its object is to provide means whereby a disk or ring of packing may be quickly inserted in and fastened to its holder, and when worn out readily and easily removed.

The invention is an improvement upon the disk-holder of the valve known as the "Jenkins" valve. In said valve the packing is held in its holder by a screw-stud integral with the holder, and which projects from the back thereof beyond the packing, and a nut which screws upon the stud and against the packing. As old worn-out packings adhere strongly to the disk-holder and stud, this construction obviously is not a desirable one, because it offers no way whereby the packing can be got at and removed.

In my invention, instead of using the fixed screw-stud and separate nut of the Jenkins holder, I use an independent or detachable screw-stud or bolt which screws through the back of the disk-holder, fastens the packing to the holder, and extends from it sufficiently to receive the cap-nut by which it and the packing and holder are fastened to the coupling-nut in the lower end of the valve-spindle.

In the drawings, A is the valve-spindle; B, the disk of packing; C, the disk-holder; $c$, the hole in the back of the holder into which the screw stud or bolt screws.

E is the screw stud or bolt, which has the cap or projection $e$ and the screw-thread $e'$ upon its shank $e^2$.

D is the cap-nut, which screws onto the end of the screw-stud E and into the end of the coupling-nut D', which has a swiveling connection with the spindle A.

F represents the valve-seat.

It will be observed that the cap-nut D, when screwed in place, comes to rest against the back of the disk-holder, receives the thrust or pressure of the spindle end, and protects the screw-stud E from being stripped from the disk-holder by driving the valve-spindle after the valve has come to its seat.

It is very essential to interpose between the end of the spindle and the screw-stud this cap-nut or a similar device, for otherwise the end of the spindle would come in contact with the upper end of the screw-stud after the valve was seated, and by continued pressure would force the stud from the disk-holder.

It is obvious that the means of holding the packing in the holder may be used in any kind of a valve, and that so far as it is concerned it makes no difference whether there is or is not a swiveling connection with the valve-spindle.

It will be observed that, aside from the readiness which this construction provides for the removal of the packing, it is also an improvement in construction over the old method.

In order that the disk-holding stud may be screwed into and removed from the holder easily, it may be provided with a recess into which the upper end of the valve-spindle may be inserted, thereby enabling it to be used as a wrench; or the stud may have the projection or rib $e^3$, by which it may be held by a vise or monkey-wrench.

It will be observed a disk-holder has a central boss in which the screw-hole is formed, and which provides a long bearing for the screw-stud, and also serves to form one of the walls of the packing-holding recess.

It will also be seen that the screw-stud is cut away or recessed under the head, or between it and the screw-thread, in order to allow it to be screwed up as much as may be desirable to properly clamp the disk of packing in place, and that there are no screw-threads thereon into which the packing may be forced.

The cap-nut can be formed in the shape of a boss upon the back of the disk-holder and be integral therewith, instead of being made separate, as shown.

Having thus fully described my invention, I claim and desire to secure by Letters Patent of the United States—

1. In a valve, the combination of the disk-holder, the packing, and the screw-stud arranged to screw into the disk-holder and fasten the packing to the holder, all substantially as and for the purposes described.

2. The combination of the disk-holder, the packing, the screw-stud arranged to screw through the disk-holder, as described, the valve-spindle, and the coupling-nut, all substantially as and for the purposes set forth.

3. A disk-holder having its back and outer packing or retaining-wall integral or of one piece, and a detachable central portion or stud adapted to screw into the back portion of the disk-holder, all substantially as and for the purposes described.

4. The combination of the disk-holder, the screw-stud, and the spindle, the disk-holder being arranged to swivel on the spindle, and the screw-stud being protected from the action of the spindle after the valve has seated, all as described.

5. The combination of the disk-holder, the screw-stud, and the spindle, and means for fastening the holder to the spindle, whereby the screw-stud is protected from the action thereof, all substantially as and for the purposes described.

6. The combination of the disk-holder, screw-stud, cap-nut, coupling-nut, and valve-spindle, as and for the purposes described.

EDWIN R. TOMLINSON.

Witnesses:
E. G. ANDREWS,
CURTIS THOMPSON.